United States Patent
O'Leary (10) Patent No.: US 9,945,243 B2
(45) Date of Patent: Apr. 17, 2018

(54) TURBINE SHROUD WITH BIASED BLADE TRACK

(71) Applicant: Rolls-Royce Corporation, Indianapolis, IN (US)

(72) Inventor: Mark O'Leary, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 305 days.

(21) Appl. No.: 14/857,185

(22) Filed: Sep. 17, 2015

(65) Prior Publication Data

US 2016/0102572 A1 Apr. 14, 2016

Related U.S. Application Data

(60) Provisional application No. 62/063,525, filed on Oct. 14, 2014.

(51) Int. Cl.
| | |
|---|---|
| *F01D 11/16* | (2006.01) |
| *F01D 11/08* | (2006.01) |
| *F01D 25/24* | (2006.01) |
| *F01D 11/12* | (2006.01) |

(52) U.S. Cl.
CPC ............ *F01D 11/08* (2013.01); *F01D 11/12* (2013.01); *F01D 11/16* (2013.01); *F01D 25/24* (2013.01); *F05D 2240/11* (2013.01); *F05D 2240/55* (2013.01); *Y02T 50/672* (2013.01)

(58) Field of Classification Search
CPC ........ F01D 11/08; F01D 11/12; F01D 11/122; F01D 11/10; F05D 2240/11; F05D 2240/55
See application file for complete search history.

(56) References Cited

U.S. PATENT DOCUMENTS

| | | | |
|---|---|---|---|
| 4,576,548 A * | 3/1986 | Smed | F01D 11/005 277/359 |
| 5,603,510 A | 2/1997 | Sanders | |
| 6,048,170 A | 4/2000 | Dodd | |
| 6,315,519 B1 * | 11/2001 | Bagepalli | F01D 11/08 415/135 |
| 6,572,115 B1 | 6/2003 | Reza et al. | |
| 6,726,448 B2 | 4/2004 | McGrath et al. | |
| 6,733,233 B2 | 5/2004 | Jasklowski et al. | |
| 6,932,566 B2 | 8/2005 | Suzumura et al. | |
| 7,189,057 B2 | 3/2007 | Lee et al. | |
| 7,207,771 B2 | 4/2007 | Synnott et al. | |

(Continued)

FOREIGN PATENT DOCUMENTS

| | | |
|---|---|---|
| DE | 102009003423 A1 | 8/2009 |
| EP | 1643172 A1 | 4/2006 |

(Continued)

OTHER PUBLICATIONS

Extended European Search Report dated Mar. 15, 2016 for European Application No. 15187765.1-1610, 8 pages.

*Primary Examiner* — Ninh H Nguyen
(74) *Attorney, Agent, or Firm* — Barnes & Thornburg LLP (57) ABSTRACT

A turbine shroud for a gas turbine engine is adapted to extend around a bladed turbine wheel and prevent gasses from passing over the blades without interacting with the blades. The turbine shroud includes a carrier, a blade track, and a plurality of biasing members. The biasing members locate the blade track relative to the carrier.

17 Claims, 7 Drawing Sheets

(56) References Cited

U.S. PATENT DOCUMENTS

| | | | |
|---|---|---|---|
| 7,229,246 B2* | 6/2007 | Ghasripoor | F04D 29/126 277/413 |
| 7,238,002 B2* | 7/2007 | Cairo | F01D 11/005 415/119 |
| 7,435,049 B2 | 10/2008 | Ghasripoor et al. | |
| 8,047,773 B2* | 11/2011 | Bruce | F01D 25/04 415/173.3 |
| 8,257,029 B2 | 9/2012 | Habarou et al. | |
| 2002/0192074 A1* | 12/2002 | Turnquist | F04D 27/0207 415/169.1 |
| 2003/0102630 A1 | 6/2003 | Dinc et al. | |
| 2012/0243977 A1 | 9/2012 | Simonet | |

FOREIGN PATENT DOCUMENTS

| | | |
|---|---|---|
| EP | 2357322 A2 | 8/2011 |
| JP | S61152906 A | 7/1986 |

\* cited by examiner

FIG. 11

TURBINE SHROUD WITH BIASED BLADE TRACK

CROSS REFERENCE TO RELATED APPLICATIONS

This application claims priority to and the benefit of U.S. Provisional Patent Application No. 62/063,525, filed 14 Oct. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from ceramic materials adapted to withstand high temperatures and metallic components adapted to support the shroud relative to the rest of the engine. Due to differing mechanical properties of ceramic components and metallic components (such as stiffness), constraining the ceramic components relative to the metallic components without inducing unwanted stresses can be difficult.

SUMMARY

The present application discloses one or more of the features recited in the appended claims and/or the following features which, alone or in any combination, may comprise patentable subject matter.

According to one aspect of the present disclosure, a turbine shroud for a gas turbine engine that extends around a central axis is taught. The turbine shroud may include a metallic carrier that extends around the central axis and a ceramic-containing composite blade track coupled to the metallic carrier In some embodiments, the turbine shroud may include a plurality of biasing members arranged between the metallic carrier and the ceramic-containing composite blade track. The biasing members may bias the ceramic-containing composite blade track outwardly in a radial direction away from the central axis to locate the ceramic-containing composite blade track relative to the metallic carrier. The plurality of biasing members may be coil springs, leaf springs, or torsion springs.

In some embodiments, the ceramic-containing composite blade track may include a plurality of blade track segments. Each blade track segment may include a runner arranged radially inward of the metallic carrier that extends around a portion of the central axis, a retention head received in the carrier and engaged by the plurality of biasing members, and a neck that extends from the runner to the retention head.

In some embodiments, the metallic carrier may be formed to include a plurality of retention arms. Each retention arm may be arranged radially between at least a portion of a corresponding runner and a corresponding retention head of a blade track segment. Each retention arm may be engaged by at least one biasing member.

In some embodiments, the turbine shroud may also include at least three hard locators. The hard locators may be arranged between the retention head of each blade track segment and the metallic blade track. The hard locators may be sized to block movement of the blade track segment toward the central axis when the blade track segment reaches a predetermined position relative to the metallic carrier.

In some embodiments, each retention arm may be formed to include a slot that receives at least a portion of a biasing member to locate the biasing member relative to the metallic carrier. Each retention arm may extend circumferentially around a portion of the central axis into a circumferentially-opening trough formed between the runner and the retention head of a blade track segment.

In some embodiments, the metallic carrier may be formed to include a plurality of retention arms. Each retention arm may be arranged radially between at least a portion of the ceramic-containing composite blade track and the central axis. The plurality of biasing members may engage the retention arms and the ceramic-containing composite blade track to bias the blade track away from the central axis. Each biasing member may be a compression spring that pushes the ceramic-containing composite blade track outwardly in the radial direction away from the central axis.

In some embodiments, the turbine shroud may include at least three hard locators arranged between the metallic carrier and the ceramic-containing composite blade track. The hard locators may block movement of the blade track toward the central axis when the blade track reaches a predetermined position in three dimensions relative to the metallic carrier. The hard point locators may be monolithically formed as part of the metallic carrier and may extend outward in the radial direction away from the central axis from a supporting portion of the metallic carrier. The hard point locators may be monolithically formed as part of the ceramic-containing composite blade track and may extend inward in the radial direction toward from the central axis from a supporting portion of the ceramic-containing composite blade track.

According to another aspect of the present disclosure, a turbine shroud that extends around a central axis may include a carrier and a blade track segment. The blade track segment may be coupled to the carrier.

In some embodiments, the turbine shroud may include plurality of biasing members. The biasing members may be arranged between the carrier and the blade track segment to bias the composite blade track segment outwardly in a radial direction away from the central axis to locate the blade track segment relative to the carrier.

In some embodiments, the carrier may be formed to include a plurality of retention arms each arranged radially between at least a portion of the blade track segment and the central axis. Each biasing member may be a compression member that pushes the blade track segment outwardly in the radial direction away from the central axis.

In some embodiments, the blade track segment may be formed to include a runner, a retention head, and a neck that extends from the runner to the retention head. The runner may be arranged radially inward of the metallic carrier and may extend around a portion of the central axis. The retention head may be arranged radially outward of the retention arms and may be engaged by the plurality of biasing members.

In some embodiments, the turbine shroud may include at least three hard locators. The three hard locators may be arranged between the carrier and the blade track segment arranged to block movement of the blade track segment toward the central axis when the blade track segment reaches a predetermined position in three dimensions relative to the carrier.

According to another aspect of the present disclosure, a method of making a turbine shroud is disclosed. The method may include mounting a ceramic-containing composite blade track segment to a metallic carrier so that a retention head of the blade track segment is received in the metallic carrier and a runner of the metallic carrier is located radially inward of the metallic carrier relative to a central axis about which the metallic carrier extends.

In some embodiments, the method may include arranging a plurality of biasing members between the blade track segment and the metallic carrier to bias the blade track away from the central axis. The method may also include machining at least three hard locators arranged between the carrier and the blade track segment to a calculated size to cause the hard locators to block movement of the blade track segment toward the central axis when the blade track segment reaches a predetermined position in three dimensions relative to the metallic carrier.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
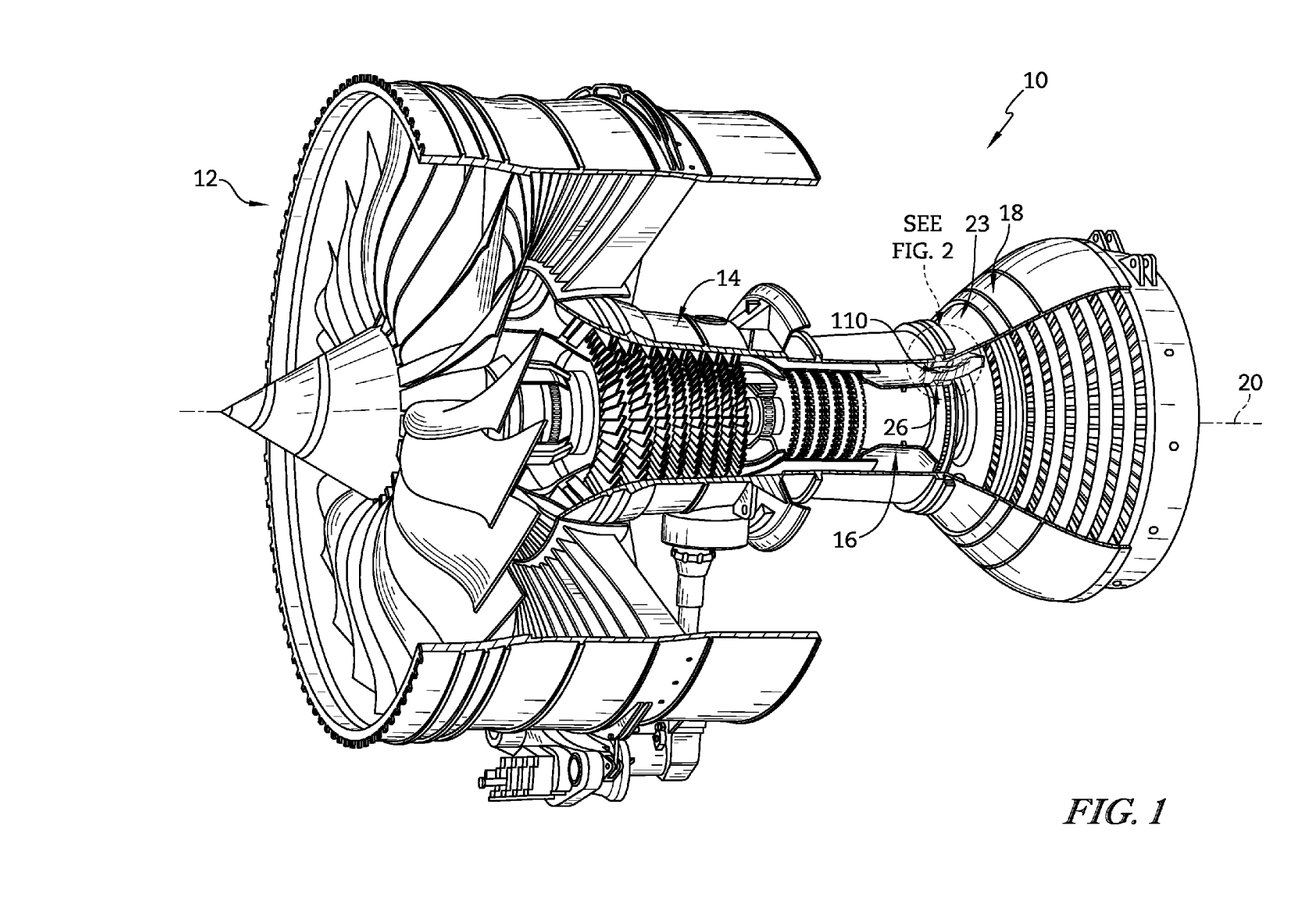
FIG. 1 is a cut-away perspective view of a gas turbine engine.

An illustrative aerospace gas turbine engine 10 cut-away in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 20 and drive the compressor 14 and the fan 12.

Figure 2:
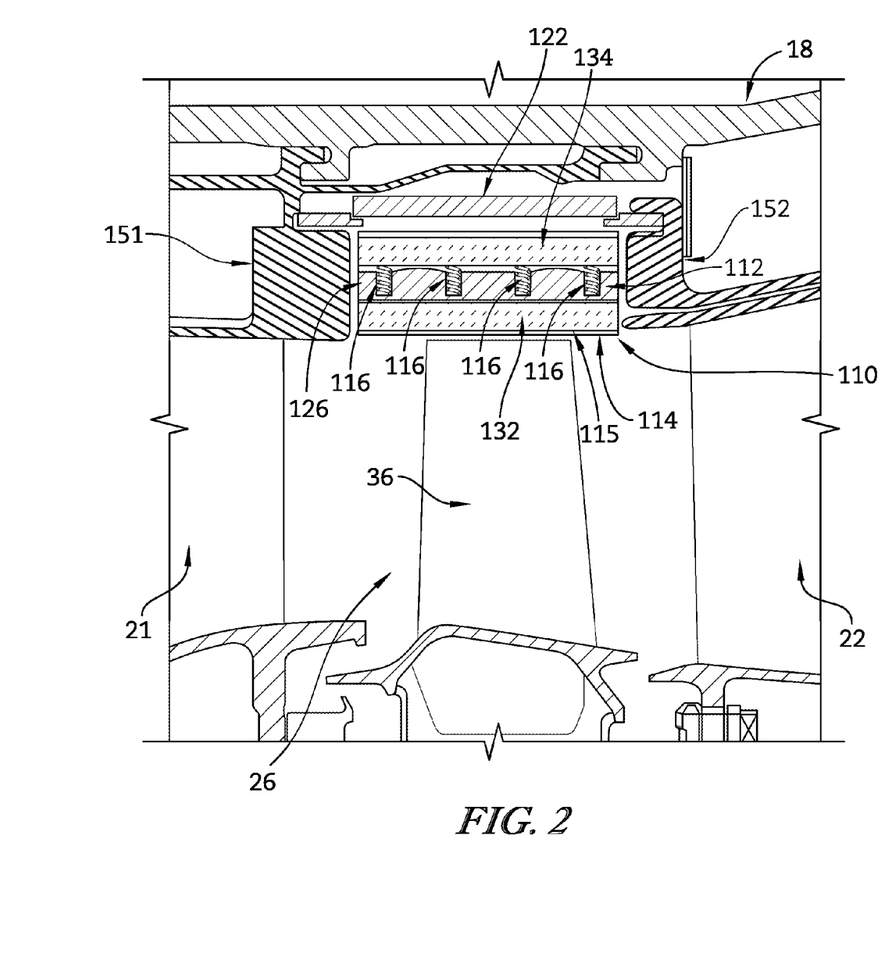
FIG. 2 is a partial cross-sectional view of the gas turbine engine of FIG. 1 showing the arrangement of a turbine shroud radially outward from blades of a turbine wheel assembly in the gas turbine engine to reduce the flow of gasses over the blade tips, and showing that the turbine shroud includes coil springs that locate a ceramic-containing blade track relative to a metallic carrier.

Referring now to FIG. 2, a portion of the turbine 18 is shown to include static turbine vane assemblies 21, 22 and a turbine wheel assembly 26. The vane assemblies 21, 22 extend across the flow path of the hot, high-pressure combustion products from the combustor 16 to direct the combustion products toward blades 36 of the turbine wheel assembly 26. The blades 36 are in turn pushed by the combustion products to cause the turbine wheel assembly 26 to rotate; thereby, driving the rotating components of the compressor 14 and the fan 12.

Figures 3, 4:
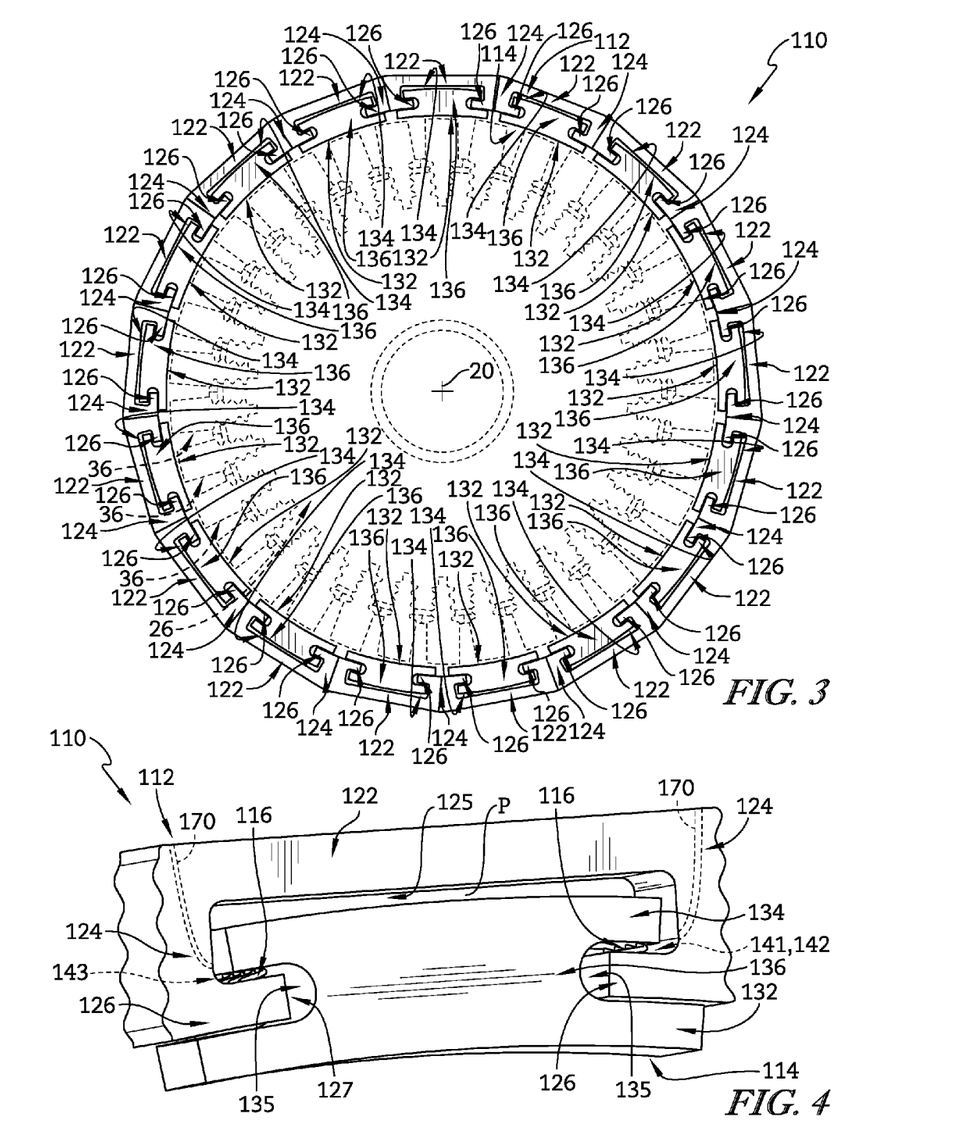
FIG. 3 is an end view of the turbine shroud of claim 2 showing the turbine shroud arranged around a phantom turbine wheel assembly to block gasses from passing over the blades without interacting with the blades.
FIG. 4 is a perspective view of one blade track segment included in the ceramic-containing blade track mounted relative to the metallic carrier showing that the coil springs are arranged to push the blade track segment away from a central axis of the gas turbine engine.

The turbine 18 also includes a turbine shroud 110 that extends around turbine wheel assembly 26 to minimize the flow of combustion products over the tips of the blades 36 without pushing the blades 36 to rotate as shown in FIGS. 2 and 3. Combustion products that are allowed to pass over the blades 36 do not push the blades 36 and such passed-over products contribute to lost performance within the engine 10.

The turbine shroud 110 illustratively includes a carrier 112, a blade track 114, and a plurality of coil springs 116 as shown in FIGS. 2, 4, 5, and 6. The carrier 112 is made from a metallic material and supports the blade track 114 in place adjacent to blades 36 of the turbine wheel assembly 26 as shown in FIG. 2. The blade track 114 is made of a ceramic-containing composite material and extends around the blades 36 of the turbine wheel assembly 26 such that the blade track 114 is exposed to the hot, high-pressure products from the combustor 14 that interact with the turbine blades 36. The coil springs 116 provide biasing members arranged between the carrier and the blade track to bias the blade track 114 outwardly in a radial direction away from the central axis 20.

Figure 5:
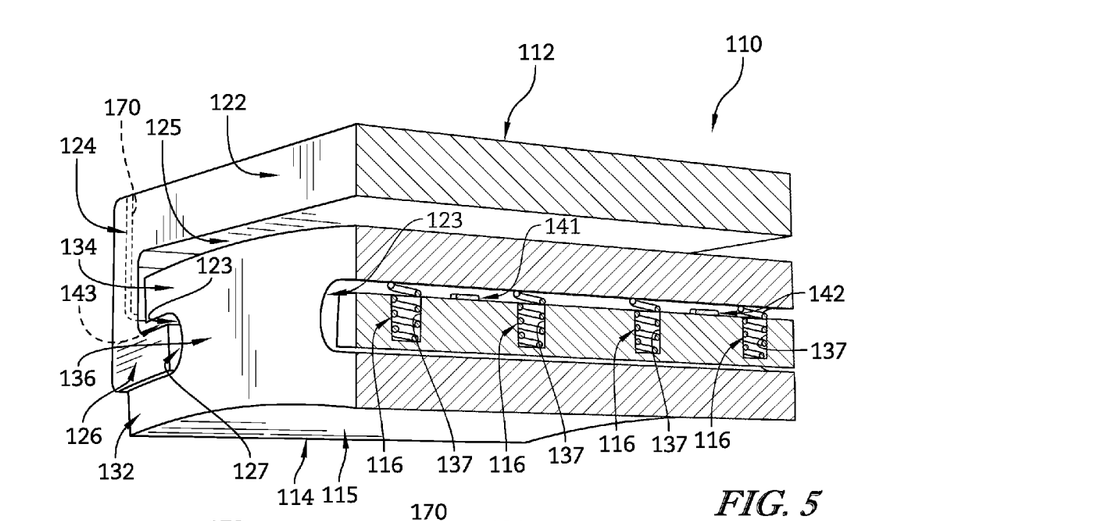
FIG. 5 is a perspective view similar to FIG. 4 with a portion of the metallic carrier and the blade track segment cut away to show the arrangement of the coil springs between the metallic carrier and the blade track segment.

The coil springs 116 act against pressure P applied to a radially-outwardly facing surface 121 of the blade track 114 by air from the compressor 14 to locate the blade track 114 relative to the carrier 112 as suggested in FIGS. 3-5. In addition to locating the blade track 114 relative to the carrier 112 and the blades 36 of the turbine when assembly 26, the coil springs 116 allow some movement of the blade track 114 relative to the carrier 112. Accordingly, the stress applied to the blade track 114 at the points of constraint by the springs 116 is reduced to accommodate relatively low stress allowables of the blade track 114.

The carrier 112 is illustratively made from a high temperature super alloy (e.g. Inconel or the like) and includes a number of segments arranged around the central axis 20 as shown in FIG. 3. The carrier 112 illustratively includes an outer ring 122, a plurality of shoulders 124, and a plurality of retention arms 126 as shown in FIGS. 3-6. The outer ring 122 forms a full hoop that is coupled to a turbine case 23 so that the turbine shroud 110 is fixed in place. The shoulders 124 extend radially inwardly from the outer ring 122 and are spaced circumferentially from one another at equal intervals around the outer ring 122. The retention arms 126 are spaced from the outer ring 122 by the shoulders 124 and extend circumferentially in both directions from the shoulders 124 at a location radially inward of the outer ring 122. In other embodiments, the carrier 112 may be made from other materials.

Figure 6:
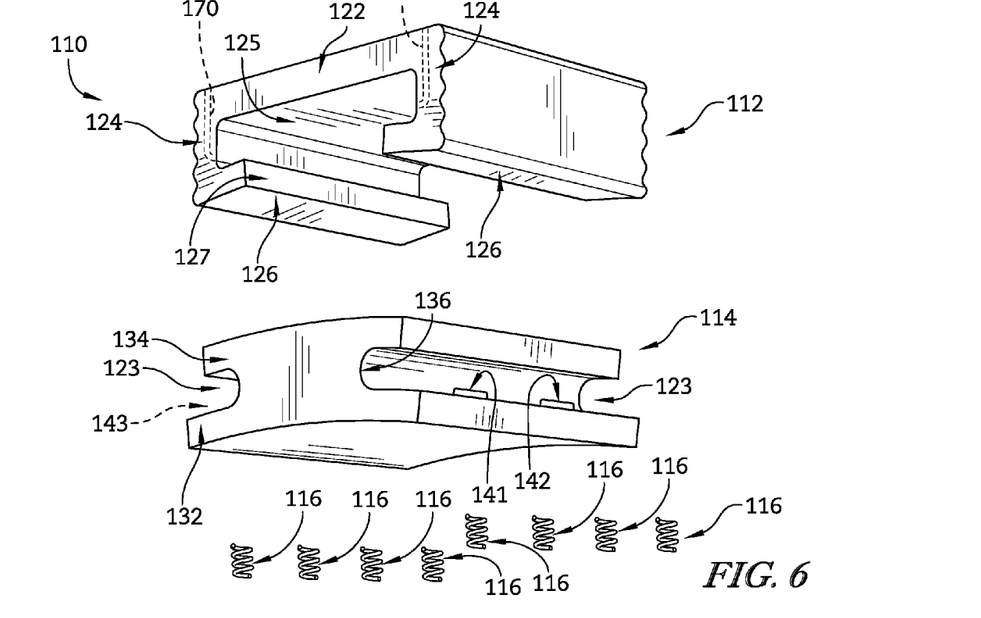
FIG. 6 is an exploded perspective view of a portion of the turbine shroud shown in FIGS. 1-5.

The blade track 114 illustratively includes a plurality of blade track segments 115 that cooperate to encircle the central axis 20 as shown in FIG. 3. Each segment 115 is made from a ceramic-containing composite material that is useable in the hot environment of the turbine gas path. Each segment 115 is illustratively formed to include a runner 132, a retention head 134, and a neck 136 interconnecting the runner 132 and the head 134 as shown in FIGS. 4-6. Each runner 132 is arranged radially inward of the carrier 112 and extends circumferentially from the neck 136 around a portion of the central axis 20. The retention head 134 is received in the carrier 112 in an axially-extending opening 125 defined by the carrier 112 and extends circumferentially from the neck 136 in both directions. The neck 136 extends from the runner 132 to the retention head 134 through a slot 127 defined between adjacent retention arms 126 of the carrier 112.

The retention arms 126 and the slot 127 are sized such that the retention head 134 is trapped in the opening 125 and cannot move out of the opening 125 by way of radial movement toward or away from the central axis 20 as shown in FIG. 4. Accordingly, each retention arm 126 of the carrier 112 extends circumferentially around a portion of the central axis 20 into a circumferentially-opening trough 135 formed between the runner 132 and the retention head 134 of a blade track segment 115.

In the illustrative embodiment, each segment 115 is made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the segments 115 may be made of other metallic, non-metallic, or composite materials with low coefficients of thermal expansion. In still other embodiments, the segments 115 may be assemblies in which at least one component of the assembly includes a ceramic material.

The plurality of coil springs 116 are compression springs made from high temperature alloys that push the segments 115 of the blade track 114 away from the central axis 20 of the engine 10 as suggested in FIG. 5. The coil springs 116 are illustratively arranged between the retention arms 126 of the carrier 112 and the retention head 134 of each segment 115. In the illustrative embodiment, the coil springs 116 engage both the carrier 112 and the retention head 134 of each segment 115 circumferentially outbound of both sides of the corresponding neck 136 as shown in FIG. 4. In the illustrative embodiment, at least a portion of each coil spring 116 is received in a corresponding slot 137 formed in a retention arm 126 that opens to face radially-outwardly so that the coil spring 116 is located relative to the carrier 112. In other embodiments, the plurality of coil springs 116 may also include or be replaced by tension springs that may extend from the outer ring 122 of the carrier 112 to the retention heads 134 of each segment 115 included in the blade track 114.

By using coiled springs 116 made from high temperature metal alloys (e.g. nickel-based alloys etc.), the stiffness and working deflection of the springs 116 may be designed either collectively or individually to guarantee support for the blade track segments 115 over a greater range of loads and temperatures than can be achieved with simply supporting contact pads or the like. In this way the stresses generated in the blade track segments 115 at the locations of support may be lowered to acceptable values.

Springs 116 may be linear or non-linear and can support the segments 115 directly as shown. In some embodiments, the springs 116 could be located elsewhere in the machine to take advantage of cooler temperatures and connected to the segments 115 via linkages, hooks and other types of connections. The springs 116 provide reduced-stiffness constraint points for the segments 115 and reduce the stress applied to the segments 115 when compared with hard constraint points. The reduced stress applied at the constraint points allow for robust design of the segments 115 made from materials with relatively low stress allowables.

The exemplary turbine shroud 110 also includes a plurality of hard locators 141, 142, 143 as shown in FIGS. 5 and 6. Each locator 141-143 is arranged between the carrier 112 and a blade track segment 115 to block movement of the blade track segment 115 toward the central axis 20 when the coil springs 116 reach a preselected level of compression and the blade track segment 115 reaches a predetermined position relative to the tips of the turbine blades 36. In illustrative embodiments, at least three locators are used to locate the segment 115 in three dimensions relative to the carrier 112 but more or fewer locators may be incorporated in other designs. In the illustrative embodiment, the hard point locators 141-143 are monolithically formed as part of the carrier 112 and extend outward in the radial direction away from the central axis 20 from a supporting portion (illustratively the retention arms 126) of the carrier 112.

In other embodiments, hard point locators may be monolithically formed as part of a blade track segment 115 and extend inward in the radial direction toward the central axis 20 from a supporting portion (illustratively the retention head 134) of the segment 115. In still other embodiments, hard point locators may be separate components such as pins; and, in some cases, may be arranged in the coil springs 116 such that the locators are held in place by springs 116 and slots 137.

In some embodiments, cooling passages 170 may be incorporated into the turbine shroud 110 to direct cooling air onto the coil springs 116 as suggested in FIGS. 4 and 6. The cooling passages 70 may be formed in the carrier 112 and may conduct cooling air from the compressor 14 or another source to the coil springs 116. By controlling the temperature of the coil springs 116, the spring constant of the springs 116 may be adjusted such that the location of the blade track segments 115 are controlled during various engine operating conditions. Accordingly, a gap between the blade track segments 115 and the turbine wheel assembly 26 can be controlled and efficiency of the engine 10 can be improved.

According to one method of making the turbine shroud 110, the blade track segments 115 are mounted to the carrier 112 to control the location of the segments 115 relative to the tips of the turbine blades 36. To mount the segments 115 to the carrier 112, the segments 115 are measured and the locators 141-143 are machined to a calculated size. The machined hard locators 141-143 are sized to block movement of the blade track segment 115 toward the central axis 120 when the blade track segment 115 reaches a predetermined position in three dimensions relative to the expected location of the turbine blades 36 at various operating conditions. In embodiments in which the locators are separate components, they may be selected for a size rather than machined and may be coupled to the carrier 112 or the segments 115.

The method further includes coupling the coil springs 116 to the carrier 112 by inserting them into slots 127 formed in the retention arms 126 as suggested in FIG. 5. The blade track segments 115 are then coupled to the carrier 112 by sliding the blade track segments 115 axially along the central axis 20 until the coil springs 116 are arranged between the retention arms 126 of the carrier 112 and the retention head 134 of the segment 115. The segments 115 may then be retained axially by forward and aft retaining plates 151, 152 as suggested in FIG. 2 and the assembly may be incorporated into the turbine case 23.

Ceramic-containing components such as the ceramic matrix composite (CMC) blade track segments 115 can be designed to withstand higher temperatures than nickel alloys. More specifically, CMC materials are attractive to make use of in gas turbine engines because they can withstand greater temperatures than single crystal nickel alloys, and can do so while requiring less cooling air. Some other gas turbine component candidates that might make use of this material technology would be: HP and IP turbine vanes, HP and IP turbine blades, and exhaust structures of many types. However, such components often have low stress allowables. This combination of high stiffness and low stress allowables makes it challenging to constrain and support CMC components in gas turbine engines and other high temperature machines.

The stresses that are created at the points of constraint of the CMC structure can exceed the low stress allowables of the material. Given this stress restriction, the natural reaction in design might be to add as many points of support for the CMC component as necessary to bring the stresses generated at the locations of support down to acceptable values. However, the large profile tolerances associated with the fabrication of CMC surfaces, combined with the high stiffness of the CMC materials, makes it difficult for structures fabricated from this material to have sufficient deflection under load to reliably 'react' against a constraint system that is more than simply supported; that is, a constraint system that contains more than three points of contact.

Designing CMC blade tracks (e.g. blade track 114) in conjunction with supporting spring mechanisms (e.g. coil springs 116) can vastly increase their chances of satisfying allowable stresses, while at the same time providing the possibility of controlling blade tip clearance and thereby increasing engine efficiency. With the introduction of the springs to support the blade track, an additional benefit ensues. With the ability to control the spring rate and the spring deflection, it is possible to adjust the clearance between the flow path side of the blade track and the tip of the turbine blade so the engine efficiency and performance can be optimized for one or more engine operating conditions.

Figure 7:
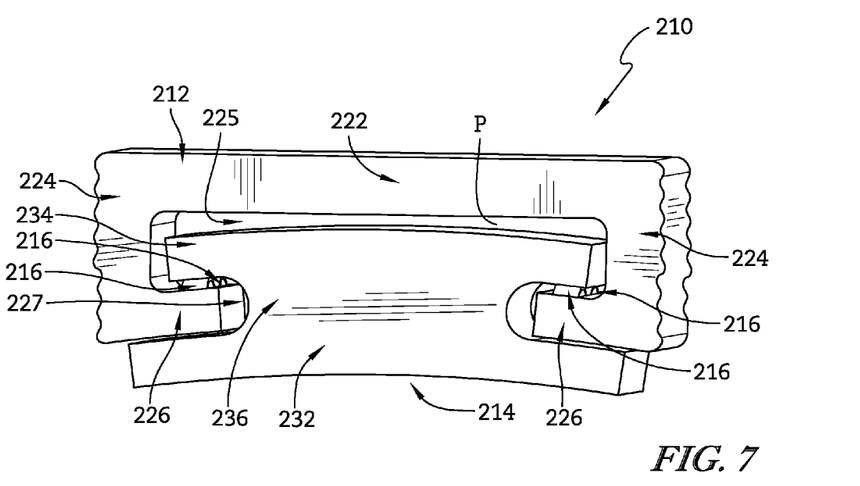
FIG. 7 is a perspective view of a portion of another turbine shroud in which leaf springs are used to push the blade track segment away from a central axis of the gas turbine engine and locate a ceramic-containing blade track relative to a metallic carrier.
Figure 8:
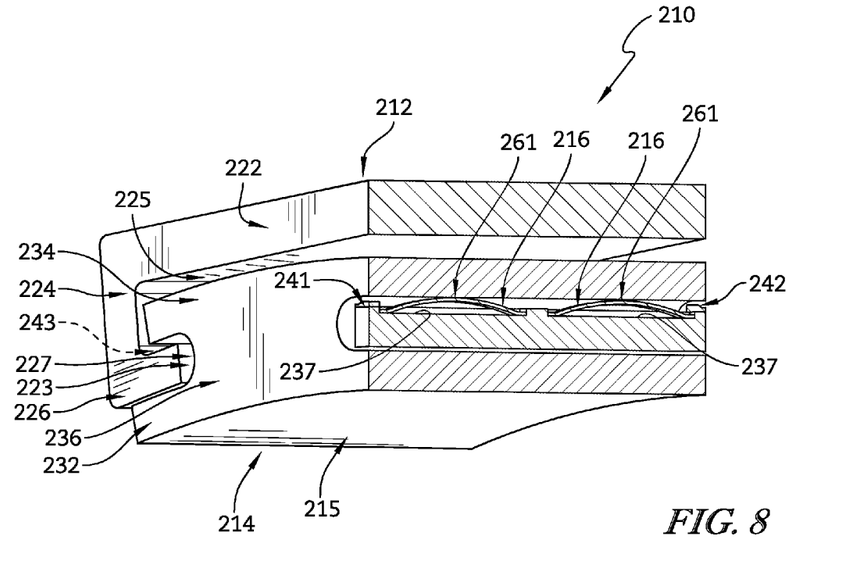
FIG. 8 is a perspective view similar to FIG. 4 with a portion of the metallic carrier and the blade track segment cut away to show the arrangement of the leaf springs between the metallic carrier and the blade track segment.
Figure 9:
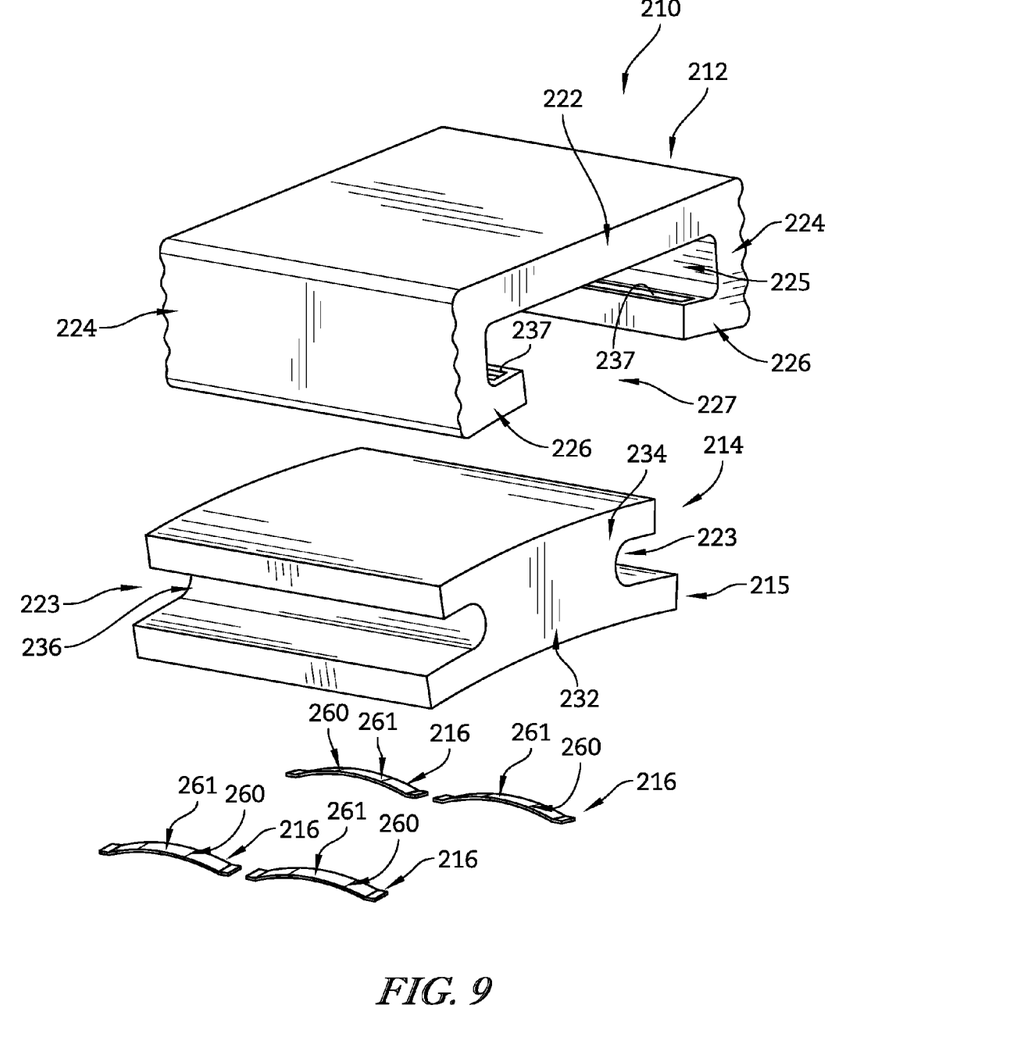
FIG. 9 is an exploded perspective view of the turbine shroud shown in FIGS. 7 and 8.

Another illustrative turbine shroud 210 is shown in FIGS. 7-9. The turbine shroud 210 is configured for use in engine 10 and is substantially similar to the turbine shroud 110 shown in FIGS. 2-6 and described herein. Accordingly, similar reference numbers in the 200 series indicate features that are common between the turbine shroud 110 and the turbine shroud 210. Further the method of assembling the turbine shroud 210 is similar to the method of assembling the turbine shroud 110 described herein. The description of the engine 10, the turbine shroud 110, and its method of assembly are hereby incorporated by reference to apply to the turbine shroud 210, except in instances when it conflicts with the specific description and drawings of the turbine shroud 210.

Unlike the turbine shroud 110, the turbine shroud 210 includes a plurality of leaf springs 216 instead of coil springs 116 as shown in FIGS. 7-9. The leaf springs 216 are made from high temperature alloys that push the segments 215 of the blade track 214 away from the central axis 20 of the engine 10. The leaf springs 216 are illustratively arranged between the retention arms 226 of the carrier 212 and the retention head 234 of each segment 215. In the illustrative embodiment, the leaf springs 216 engage both the carrier 212 and the retention head 234 of each segment 215 circumferentially outbound of both sides of the corresponding neck 236 as shown in FIG. 7. In the illustrative embodiment, at least a portion of each leaf spring 216 is received in a corresponding slot 237 formed in a retention arm 226 that opens to face radially-outwardly so that the leaf spring 216 is located relative to the carrier 212.

By using bowed leaf springs 216 made from high temperature metal alloys, the stiffness and working deflection of the springs 216 could be designed either collectively or individually to guarantee support for the blade track segment 215 over a greater range of loads and temperatures than can be achieved with simply supporting contact pads. In this way the stresses generated in the segment 215 at the locations of support could be lowered to acceptable values.

Springs 216 could be linear or non-linear and can support the segments 215 directly as shown in FIGS. 7 and 8. Spring rates and deflections may be tuned or designed to achieve a desired blade tip clearance for one or more engine operating conditions.

In the illustrative embodiment, a surface treatment 261 is applied to a contact patch 260 of the springs 216 with the blade track segments 215. The surface treatment 261 is configured to facilitate sliding between the spring and blade track segments 215. The surface treatment 261 may be a coating, thin layer of material, etc. In other embodiments, the springs 216 could be located elsewhere in the machine to take advantage of cooler temperatures and could be connected to the segments 215 via linkages, hooks and other types of connections. Springs do not have to be symmetric as shown, but could be asymmetrical if the resulting spring rate and range and direction of deflection provide an advantage.

Figure 10:
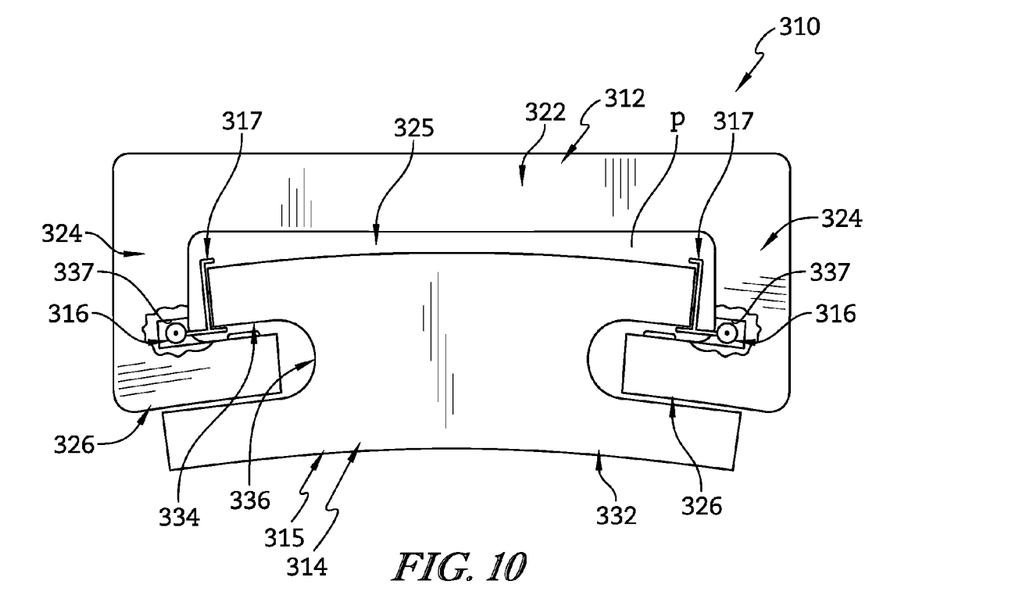
FIG. 10 is a perspective view of a portion of yet another turbine shroud in which torsion springs are used to push the blade track segment away from a central axis of the gas turbine engine and locate a ceramic-containing blade track relative to a metallic carrier.
Figure 11:
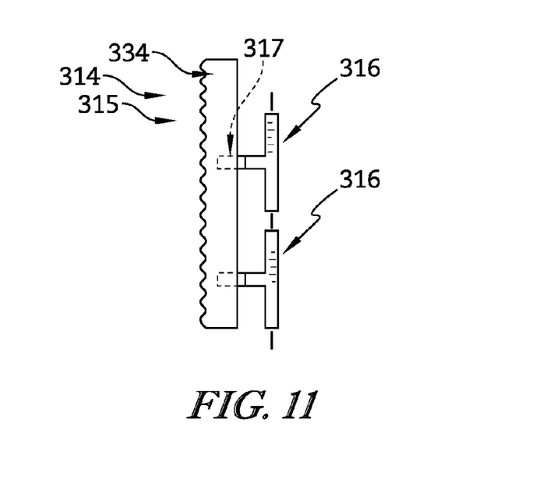
FIG. 11 is a cross-sectional view of a portion of FIG. 10.

Another illustrative turbine shroud 310 is shown in FIGS. 10-11. The turbine shroud 310 is configured for use in engine 10 and is substantially similar to the turbine shroud 110 shown in FIGS. 2-6 and described herein. Accordingly, similar reference numbers in the 300 series indicate features that are common between the turbine shroud 110 and the turbine shroud 310. Further the method of assembling the turbine shroud 310 is similar to the method of assembling the turbine shroud 110 described herein. The description of the engine 10, the turbine shroud 110, and its method of assembly are hereby incorporated by reference to apply to the turbine shroud 310, except in instances when it conflicts with the specific description and drawings of the turbine shroud 310.

Unlike the turbine shroud 110, the turbine shroud 310 includes a plurality of torsion springs 316 instead of coil springs 116 as shown in FIGS. 10-11. The torsion springs 316 are made from high temperature alloys that push the segments 315 of the blade track 314 away from the central axis 20 of the engine 10. The torsion springs 316 are illustratively arranged between the shoulders 324 of the carrier 312 and the retention head 234 of each segment 215. In the illustrative embodiment, the torsion springs 316 engage both the carrier 312 and the retention head 334 of each segment 315 circumferentially outbound of both sides of the corresponding neck 336 as shown in FIG. 10. In the illustrative embodiment, at least a portion of each torsion spring 316 is received in a corresponding slot 339 formed in a shoulder 324 opened to face circumferentially toward the opening 325 so that the torsion springs 316 are located relative to the carrier 312. Further, each torsion spring 316 is formed to include a bracket 317 that receives a portion of the retention head 334 included in a corresponding segment 315 as shown in FIG. 10.

Any number of torsional springs 316 could be employed to control the stress in the blade track segments 315. Further, each torsion spring 316 may be designed to provide a preselected displacement at one or more engine operating conditions in order to optimize blade tip clearance for maximum engine performance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for a gas turbine engine that extends around a central axis, the turbine shroud comprising
   a metallic carrier that extends around the central axis,
   a ceramic-containing composite blade track coupled to the metallic carrier, and
   a plurality of biasing members arranged between the metallic carrier and the ceramic-containing composite blade track to bias the ceramic-containing composite blade track outwardly in a radial direction away from the central axis to locate the ceramic-containing composite blade track relative to the metallic carrier,
   wherein the metallic carrier is formed to include a plurality of retention arms each arranged radially between at least a portion of a corresponding runner and a corresponding retention head of a blade track segment, each retention arm is engaged by at least one biasing member and formed to include a slot that receives at least a portion of a biasing member to locate the biasing member relative to the metallic carrier, and the slot of each retention arm extends radially toward the corresponding runner without extending radially all the way through the retention arm.

2. The turbine shroud of claim 1, wherein the plurality of biasing members are coil springs, leaf springs, or torsion springs.

3. The turbine shroud of claim 1, wherein the ceramic-containing composite blade track includes a plurality of blade track segments and each blade track segment includes a runner arranged radially inward of the metallic carrier that extends around a portion of the central axis, a retention head received in the carrier and engaged by the plurality of biasing members, and a neck that extends from the runner to the retention head.

4. The turbine shroud of claim 1, further comprising at least three hard locators arranged between the retention head of each blade track segment and the metallic carrier, wherein the at least three hard locators are sized to block movement of the blade track segment toward the central axis when the blade track segment reaches a predetermined position relative to the metallic carrier.

5. The turbine shroud of claim 1, wherein each retention arm extends circumferentially around a portion of the central axis into a circumferentially-opening trough formed between the runner and the retention head of a blade track segment.

6. The turbine shroud of claim 1, wherein the plurality of retention arms are each arranged radially between at least a portion of the ceramic-containing composite blade track and the central axis.

7. The turbine shroud of claim 6, wherein the plurality of biasing members engage the ceramic-containing composite blade track to bias the blade track away from the central axis.

8. The turbine shroud of claim 7, wherein each biasing member is a compression spring that pushes the ceramic-containing composite blade track outwardly in the radial direction away from the central axis.

9. The turbine shroud of claim 1, further comprising at least three hard locators arranged between the metallic carrier and the ceramic-containing composite blade track to block movement of the blade track toward the central axis when the blade track reaches a predetermined position in three dimensions relative to the metallic carrier.

10. The turbine shroud of claim 9, wherein the hard point locators are monolithically formed as part of the metallic carrier and extend outward in the radial direction away from the central axis from a supporting portion of the metallic carrier.

11. The turbine shroud of claim 9, wherein the hard point locators are monolithically formed as part of the ceramic-containing composite blade track and extend inward in the radial direction toward from the central axis from a supporting portion of the ceramic-containing composite blade track.

12. A turbine shroud that extends around a central axis, the turbine shroud comprising
    a carrier,
    a blade track segment coupled to the carrier, and
    a plurality of biasing members arranged between the carrier and the blade track segment to bias the composite blade track segment outwardly in a radial direction away from the central axis to locate the blade track segment relative to the carrier,
    wherein the carrier is formed to include a plurality of retention arms each arranged radially between at least a portion of the blade track segment and the central axis, each retention arm is engaged by at least one biasing member and formed to include a blind slot that receives a portion of a biasing member to locate the biasing member relative to the carrier, and the blind slot of each retention arm extends radially toward the central axis.

13. The turbine shroud of claim 12, wherein each biasing member is a compression member that pushes the blade track segment outwardly in the radial direction away from the central axis.

14. The turbine shroud of claim 12, wherein the blade track segment is formed to include a runner arranged radially inward of the metallic carrier that extends around a portion of the central axis, a retention head arranged radially outward of the retention arms and engaged by the plurality of biasing members, and a neck that extends from the runner to the retention head.

15. The turbine shroud of claim 12, further comprising at least three hard locators arranged between the carrier and the blade track segment arranged to block movement of the blade track segment toward the central axis when the blade track segment reaches a predetermined position in three dimensions relative to the carrier.

16. A method of making a turbine shroud, the method comprising mounting a ceramic-containing composite blade track segment to a metallic carrier so that a retention head of the blade track segment is received in the metallic carrier and a runner of the blade track segment is located radially inward of the metallic carrier relative to a central axis about which the metallic carrier extends, forming a plurality of blind slots in a plurality of retention arms of the metallic carrier that are arranged radially between at least a portion of the retention head of the blade track segment and the central axis, wherein forming the plurality of blind slots includes forming blind slots so that they extend radially toward the central axis, and arranging a plurality of biasing members in the blind slots between the blade track segment and the metallic carrier to bias the blade track away from the central axis.

17. The method of claim 16, further comprising machining at least three hard locators arranged between the carrier and the blade track segment to a calculated size to cause the hard locators to block movement of the blade track segment toward the central axis when the blade track segment reaches a predetermined position in three dimensions relative to the metallic carrier.

* * * * *